US011842504B2

(12) United States Patent
Ma et al.

(10) Patent No.: US 11,842,504 B2
(45) Date of Patent: Dec. 12, 2023

(54) SYSTEMS AND METHODS FOR IMAGE PROCESSING BASED ON OPTIMAL TRANSPORT AND EPIPOLAR GEOMETRY

(71) Applicant: Mitsubishi Electric Research Laboratories, Inc., Cambridge, MA (US)

(72) Inventors: Yanting Ma, Allston, MA (US); Dehong Liu, Lexington, MA (US); Petros Boufounos, Winchester, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 195 days.

(21) Appl. No.: 17/401,577

(22) Filed: Aug. 13, 2021

(65) Prior Publication Data
US 2023/0052582 A1 Feb. 16, 2023

(51) Int. Cl.
*G06T 7/33* (2017.01)
*G06K 9/62* (2022.01)
*G06F 18/22* (2023.01)

(52) U.S. Cl.
CPC ............ *G06T 7/337* (2017.01); *G06F 18/22* (2023.01); *G06T 2207/10012* (2013.01); *G06T 2207/10024* (2013.01); *G06T 2207/10028* (2013.01); *G06T 2207/10044* (2013.01); *G06T 2207/10048* (2013.01); *G06T 2207/20221* (2013.01)

(58) Field of Classification Search
CPC .......... G06T 7/337; G06T 2207/10012; G06T 2207/10024; G06T 2207/10028; G06T 2207/10044; G06T 2207/10048; G06T 2207/20221; G06F 18/22
See application file for complete search history.

(56) References Cited

U.S. PATENT DOCUMENTS

| | | | |
|---|---|---|---|
| 8,855,442 B2 * | 10/2014 | Owechko | G06T 7/344 382/284 |
| 9,245,201 B1 * | 1/2016 | Jin | G06V 30/2504 |
| 9,280,821 B1 * | 3/2016 | Choe | G06T 7/73 |
| 10,097,805 B2 * | 10/2018 | Bishop | H04N 13/271 |
| 10,326,979 B2 * | 6/2019 | Hall | H04N 13/246 |
| 10,970,815 B2 * | 4/2021 | Ely | G06T 7/344 |
| 11,143,514 B2 * | 10/2021 | Bai | G01C 21/3848 |

\* cited by examiner

*Primary Examiner* — Gregory M Desire
(74) *Attorney, Agent, or Firm* — Gennadiy Vinokur; Hironori Tsukamoto (57) ABSTRACT

Systems and methods for image processing for determining a registration map between a first image of a scene with a second image of the scene, include solving an optimal transport (OT) problem to produce the registration map by optimizing a cost function that determines a minimum of a ground cost distance between the first and the second images modified with an epipolar geometry-based regularizer including a distance that quantifies the violation of an epipolar geometry constraint between corresponding points defined by the registration map. The ground cost compares a ground cost distance of features extracted within the first image with a ground cost distance of features extracted from the second image.

20 Claims, 9 Drawing Sheets

SYSTEMS AND METHODS FOR IMAGE PROCESSING BASED ON OPTIMAL TRANSPORT AND EPIPOLAR GEOMETRY

FIELD

The present disclosure relates generally to imaging processing, and more particularly to generation of a registration map for registration and fusion of multiple images of a three dimensional (3D) scene.

BACKGROUND

Several imaging techniques are available to image a scene. Since each imaging technique has its own strengths and weaknesses and may provide different types of information, it may be advantageous in practice to combine different imaging techniques to accurately depict features of the scene. To successfully integrate two or more imaging systems and/or combine information provided by distinct systems, it is necessary to register image data that may often be obtained in different modalities. Image registration geometrically aligns two images with different viewing geometry and/or different terrain distortions into the same coordinate system so that the corresponding pixels represent the same objects/features. Accurate image-to-image registration improves usability in many applications including georeferencing, change detection and time series analysis, data fusion, the formation of image mosaics, digital elevation model (DEM) extraction, 3D modeling, video compression and motion analysis, etc.

Conventional approaches to registration typically involve complex computational procedures and may not provide sufficient accuracy. Known image registration methods primarily involve four basic steps: 1) feature selection, 2) feature matching based on a similarity measure, 3) transformation model determination, and 4) image transformation and resampling. Image registration methods provide different combinations of choices for the four components. However, in instances where the images do not belong to a common regime (for example when they are of different modalities), registration using the conventional methods is not possible because feature matching is not achievable in such cases.

Therefore, to meet the requirements of modern imaging applications, the present disclosure addresses the need to develop universally applicable image registration systems and methods suitable for multimodal images of three dimensional (3D) scenes.

SUMMARY

Image registration is the process of transforming different sets of data into one coordinate system. Data may be multiple photographs, data from different sensors, times, depths, or viewpoints. It is used in computer vision, medical imaging, aerial photography, remote sensing (cartography updating), and compiling and analyzing images and data from satellites. For example, images of a three-dimensional scene taken from different view angles with different illumination spectral bands can potentially capture rich information about the scene, provided that those images can be efficiently fused. Registration of those images is a crucial step for successful fusion and/or to compare or integrate the data obtained from these different measurements. To that end, various registration methods using intensity-based and feature-based information extracted from different images have been developed. However, all these methods have some advantages and disadvantages making them applicable to one application but not the other.

For example, some methods use a 2D image transformation based on homography for projective cameras to reconstruct a common 3D scene from 2D aerial images. However, when the 3D scene contains objects with the non-negligible difference in elevation from the ground, e.g., cars and tall buildings, a 2D image transformation based on homography for projective cameras is insufficient for parallax-free registration in our case.

If full information (internal parameters and position) of the camera is known, then a 3D reconstruction of the scene from 2D images can be readily performed. Based on this, one line of work focuses on camera calibration with subsequent 3D scene reconstruction. Determining the calibration parameters, however, is a challenging task more suitable for video capturing the sequence of images in succession.

SIFT flow algorithm consists of matching densely sampled, pixel-wise SIFT features between two images. The SIFT flow algorithm is a direct pixel-to-pixel registration method that does not require 3D reconstruction as the first step. Instead, it tries to find a pixel-wise displacement map between two images via matching dense SIFT feature computed at each pixel, with an additional regularization term to impose that the displacement for pixels in a neighborhood should be similar. SIFT is invariant to affine illumination change since the feature is based on the direction of gradient combined with appropriate normalization. However, it does not work well for nonlinear illumination changes, such as those induced by shadows of a 3D object.

Optimal transport (OT) has also been considered for registration tasks. The OT involves defining a similarity measure between features of the two images to be registered, for instance, this similarity can be the distance between pixel intensity values or higher-dimensional features such as SIFT. However, when the features of the two images do not lie in the same space (as in multi-modal images), it is challenging to define an appropriate distance between the features of one image and those of the other. For example, while distance metrics borrowed from epipolar geometry are useful for multi-view image registration and fusion when images are taken with a common modality, with arbitrarily modality-specific features, it is impractical (or even impossible) to define a distance between features extracted from different modalities. As a result, various distance metrics available in the literature result in OT optimization of the non-convex cost functions that do not guarantee finding a global optimum or at least a suitable local minimum.

It is an object of some embodiments to provide image registration using an optimal transport (OT) method that does not need camera calibration for acquiring different images of a scene while being suitable for registering multi-modal images of the scene acquired from the same or different view angles.

Some embodiments are based on a recognition that image registration can use various transformation models to relate a target image to the reference image. Specifically, the OT method solves an optimization problem to find a transformation that attempts to minimize a distance between the features extracted from the reference image and the transformed target image. In OT, the distance between individual features extracted is often referred to as the ground cost, while the minimum of the optimization problem is an OT distance.

Appropriate choice of features and distance is crucial for OT methods. However, defining the distance between multimodal images is challenging, because features extracted from images taken by different modalities may not be directly comparable.

One example OT distance is the Wasserstein distance, in which the ground cost attempts to compare features of individual points in one image to features of points in the other. Using the Wasserstein distance is based on the realization that features extracted from two corresponding points in the two images will be similar, while features extracted from two non-corresponding points in the two images will be dissimilar. However, the Wasserstein distance may not work well when the features extracted from corresponding points in the two images are very different, which is likely to be the case for multi-modal images.

Another example OT distance is the Gromov-Wasserstein (GW) distance, in which the ground cost attempts to match pairs of points in one image to pairs of points in the other image, such that the ground cost distance of features extracted from the pair in the first image is similar to the ground cost of features extracted from the pair in the second image for corresponding pairs.

An important realization is that Gromov-Wasserstein distance is more appropriate for registering multi-modal images because the ground cost distance is computed only within points of the same image, i.e., within the same modality, and therefore, features extracted from points in different modalities are never directly compared. Instead, the optimization for generating the registration map is performed by comparing ground cost distances between features, instead of comparing features directly. Therefore, features in each modality can be chosen or designed separately from the features in the other modality, with the features in each modality being appropriate for extracting the correct information from that modality. For example, one modality could use SIFT, BRIEF, or BRISK features, among others, while the other could use SAR-SIFT, or RGB pixel values, or learning-based features, among others. On the other hand, using Wasserstein distance would require that both modalities use the same features, e.g., SIFT, even if this kind of feature is not appropriate for both modalities.

Computing the Gromov-Wasserstein distance involves the minimization of a non-convex function of a registration map, where no existing algorithms have been proven to find a global optimum. To that end, it is an object of some embodiments to disclose such an OT method that is suitable for finding a better local optimum.

Some embodiments are based on a recognition that none of the OT methods used a distance derived from the epipolar geometry. This is because when the two images to be registered are images of planar scenes, a 2D homography (3-by-3 matrix) for projective cameras is sufficient for a global warping of the target image, i.e., a warping of the target image using only a few parameters that are the same for the whole image, and can be computed using only a few matching points between the two images. Therefore, a pixel-by-pixel registration map obtained by OT methods is redundant and unnecessary.

However, in some situations, homography for projective cameras is insufficient for parallax-free registration. For example, in aerial photography with sufficiently high resolution, the aerial images include objects with the non-negligible difference in elevation from the ground, e.g., cars and tall buildings. In these situations, image registration with a homography matrix would fail because the homography is different in different elevations and the elevations of the objects in the images are usually unknown. Instead of homography, the geometric relation between two images of possibly non-planar scenes can be characterized by a fundamental matrix derived from epipolar geometry.

However, the fundamental matrix by itself is insufficient for the purpose of registration, because, in the presence of elevation uncertainty, the fundamental matrix can only map a point in one image to the corresponding epipolar line in the other, whereas registration requires mapping a point in one image to a point in the other. In such situations it is not possible to directly compute a global warping of the target image to register it with the reference image, and one may consider OT methods to obtain a pixel-by-pixel registration map. However, since a global warping does not exist, it is not obvious how to formulate a combination of global registration methods based on epipolar geometry and pixel-by-pixel registration methods, such as OT.

Some embodiments are based on the realization that OT methods can benefit from epipolar geometry. Specifically, it is realized that even though epipolar geometry is not able to map a point from the target image to a unique point in the reference image, it can still constrain the points in the reference image to which the point in the target image can be mapped. For example, the registration map should map a point in one image to a point on the corresponding epipolar line in the other image defined by the fundamental matrix between the two images.

Therefore, a key realization is that when different images capture the same scene, the resulting registration map provided by the OT method should obey constraints derived from epipolar geometry. Another realization is that such a constraint can be incorporated in the cost function of the OT method. In particular, a distance that quantifies how much the epipolar geometry is violated can be used as a regularizer in the cost function of the OT method, such that the optimization, e.g., minimization, of the cost function also attempts to minimize the regularizer. In such a manner, some example embodiments are directed towards using the epipolar geometry-based regularizer to penalize registration maps that violate epipolar geometry constraints, which results in finding a better solution of the optimization problem.

Some embodiments of the present disclosure are based on an image registration and fusion framework for multimodal images incorporating epipolar geometry and OT methods. Epipolar geometry can fundamentally be explained as the geometry of stereo vision. For example, when two cameras view a 3D scene from two distinct positions, there are a number of geometric relations between the 3D points and their projections onto the two-dimensional (2D) images that lead to constraints between the image points. These relations can be derived based on the assumption that the cameras can be approximated by the pinhole camera model. If the relative position of the two cameras viewing the 3D scene is known, then for each point observed in one image the same point must be observed in the other image on a known epipolar line. This provides an epipolar constraint which can also be described by the fundamental matrix between the two cameras. Using this epipolar constraint it is possible to test if two points correspond to the same 3D point. Such a use of epipolar geometry may be considered as a positive use, wherein the geometry is used for direct computation of matching points.

However, when camera calibration is an unknown parameter, which is very likely with multimodal images, the positive use of epipolar geometry does not fit into the computation. As such, the amount of violation of the epipolar geometry for each pair of points from the two images is a better constraint to help minimize the OT distance between the two images. This violation may be considered as epipolar geometry's negative usage.

To better understand how the methods and systems of the present disclosure can be implemented, at least one approach includes having at least three phases: cost function optimization, registration map generation, and image registration. It is contemplated other phases may be incorporated depending upon the specific application.

After acquiring the images, as a part of the cost function optimization, feature extraction and distance estimation is initiated. Feature extraction involves extracting universal features between the images and modality specific features between the images. Distance estimation involves estimating distance between the images at least based on epipolar geometry. The cost function which determines a minimum of a ground cost distance between the first and the second images, is modified with an epipolar geometry-based regularizer. As a part of the registration map generation, the modified cost function is optimized to produce the registration map as the optimal transport plan. Subsequently, the image registration of the target image is performed according to the produced registration map.

Some example embodiments provide a system for image processing for determining a registration map between a first image of a scene with a second image of the scene. The system including a computer readable memory having instructions stored thereon. A processor in communication with the computer readable memory is configured to execute the instructions to solve an optimal transport (OT) problem to produce the registration map. Towards this end, the processor is configured to optimize a cost function that determines a minimum of a ground cost distance between the first and the second images modified with an epipolar geometry-based regularizer. The regularizer includes a distance that quantifies the violation of an epipolar geometry constraint between corresponding points defined by the registration map. The ground cost compares a ground cost distance of features extracted within the first image with a ground cost distance of features extracted from the second image.

According to an embodiment, an image processing method for determining a registration map between a first image of a scene with a second image of the scene is provided. The method comprises solving an optimal transport (OT) problem to produce the registration map. Solving the OT problem includes optimizing a cost function that determines a minimum of a ground cost distance between the first and the second images modified with an epipolar geometry-based regularizer. The regularizer includes a distance that quantifies the violation of an epipolar geometry constraint between corresponding points defined by the registration map. The ground cost compares a ground cost distance of features extracted within the first image with a ground cost distance of features extracted from the second image.

According to another embodiment, a non-transitory computer readable storage medium embodied thereon a program executable by a computer for performing an image processing method is provided. The method comprises solving an optimal transport (OT) problem to produce the registration map. Solving the OT problem includes optimizing a cost function that determines a minimum of a ground cost distance between the first and the second images modified with an epipolar geometry-based regularizer. The regularizer includes a distance that quantifies the violation of an epipolar geometry constraint between corresponding points defined by the registration map. The ground cost compares a ground cost distance of features extracted within the first image with a ground cost distance of features extracted from the second image.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Images of a three-dimensional scene taken from different view angles with different illumination spectral bands can potentially capture rich information about the scene, provided that those images can be efficiently fused. The image fusion process is defined as gathering all the important information from multiple images, and their inclusion into fewer images, usually a single one. This single image is more informative and accurate than any single source image, and it consists of all the necessary information. The purpose of image fusion is not only to reduce the amount of data but also to construct images that are more appropriate and understandable for the human and machine perception. Several situations in image processing require both high spatial and high spectral information in a single image. This is particularly important in computer vision, remote sensing, and satellite imaging. However, available imaging instruments are not capable of providing such information either by design or because of observational constraints. The images used in image fusion should already be registered. Misregistration is a major source of error in image fusion. Thus, registration of those images is a crucial step for successful fusion.

Image registration is the process of transforming different sets of data into one coordinate system. Data may be multiple photographs, data from different sensors, times, depths, or viewpoints. Registration is necessary in order to be able to compare or integrate the data obtained from different measurements. Feature-based registration schemes establish a correspondence between a number of spatially distinct points in images. Knowing the correspondence between a number of points in images, a geometrical transformation can be determined to map the target image to the reference images, thereby establishing point-by-point correspondence between the reference and target images.

Oftentimes, there are circumstances where features of images to be registered are not directly comparable with each other. For example, in a scenario where the intensity values are measured with different illumination spectrum and/or when they are taken from different view angles, it is not possible to perform image registration by intensity based or feature-based registration methods.

Some example embodiments described herein, address these problems by comparing inter-relationship between pixels in one image to the inter-relationship between pixels in the other image to define a registration map between the two images. Some example embodiments are directed towards providing image registration using an optimal transport (OT) method that does not need camera calibration for acquiring different images of a scene while being suitable for registering multi-modal images of the scene acquired from the same or different view angles. Towards this end, some example embodiments are based on the realization that when the images to be registered are two dimensional (2D) projections of a common three dimensional (3D) scene, Sampson discrepancy can be utilized as a regularizer, where the fundamental matrix is estimated from the images and so camera positions need not be known.

Available OT methods involve defining a similarity measure between features of the two images to be registered, for instance, this can be the $l_p$ distance between pixel intensity values or higher dimensional features such as SIFT. When the features of the two images do not lie in the same space, it may not be possible to define an appropriate distance between the features of one image and those of the other. In the special case where features of one image is an isometric transform of features of the other, a similarity measure between pair-wise distance in one image and that of the other may be defined, where the distances defined on the two images need not be the same and should be chosen based on the isometry.

The proposed OT method solves an optimization problem to find a transformation that attempts to minimize a distance between the features extracted from the reference image and the transformed target image. In OT, the distance between individual features extracted is often referred to as the ground cost, while the minimum of the optimization problem is an OT distance. Some example embodiments are based on utilizing Gromov-Wasserstein (GW) distance as OT distance. GW distance is also beneficial for image registration purposes when the images correspond to scenes having elevations and depressions (i.e. where terrain is not flat). In OT distance, the ground cost attempts to match pairs of points in one image to pairs of points in the other image, such that the ground cost distance of features extracted from the pair in the first image is similar to the ground cost of features extracted from the pair in the second image for corresponding pairs. As such, the ground cost distance is computed only within points of the same image, i.e., within the same modality, and therefore, features extracted from points in different modalities are never directly compared.

Some example embodiments thus provide opportunities where features in each modality can be chosen or designed separately from the features in the other modality, with the features in each modality being appropriate for extracting the correct information from that modality. For example, one modality could use SIFT, BRIEF, or BRISK features, among others, while the other could use SAR-SIFT, or RGB pixel values, or learning-based features, among others.

Some example embodiments are based on the realization that the optimization problem defined to compute the GW distance is nonconvex and it may only provide a local minimum. Towards this end, some example embodiments are based on the realization that the images used for registration are 2D projections of a common 3D scene. Accordingly, some example embodiments incorporate epipolar geometry to regularize the non-convex optimization problem defined to compute the GW distance. Specifically, some example embodiments determine whether epipolar geometry is violated as a soft constraint defined as a discrepancy. Thus, example embodiments provide a unique combination of optimal transport and epipolar geometry for solving the longstanding problem of registration of data whose features cannot be directly compared.

At least three phases are incorporated with embodiment of the present disclosure, which include cost function optimization, image registration, and image fusion. It is contemplated that other phases may be incorporated depending upon the specific application.

Figure 1A:
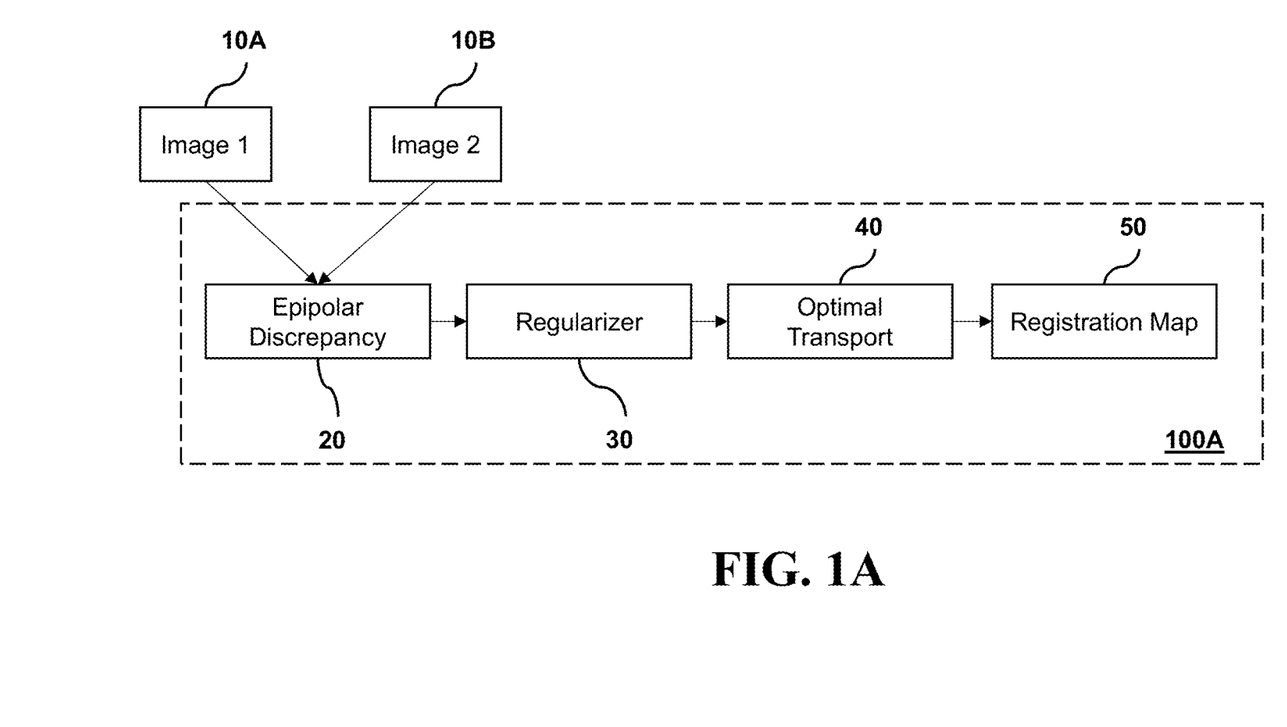
FIG. 1A is a block diagram of a framework for generating a registration map for image registration, according to example embodiments of the present disclosure.
Figure 1B:
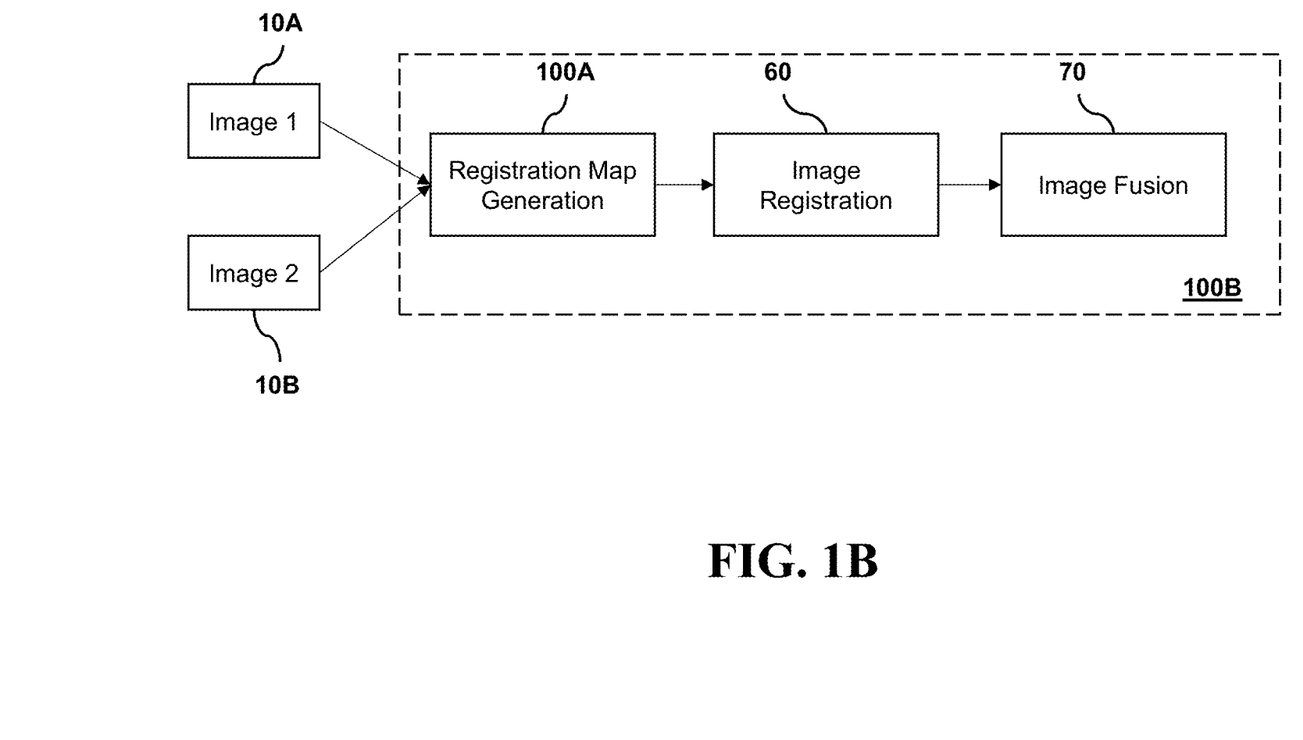
FIG. 1B is a block diagram of a framework for image fusion, according to embodiments of the present disclosure.
Figure 1C:
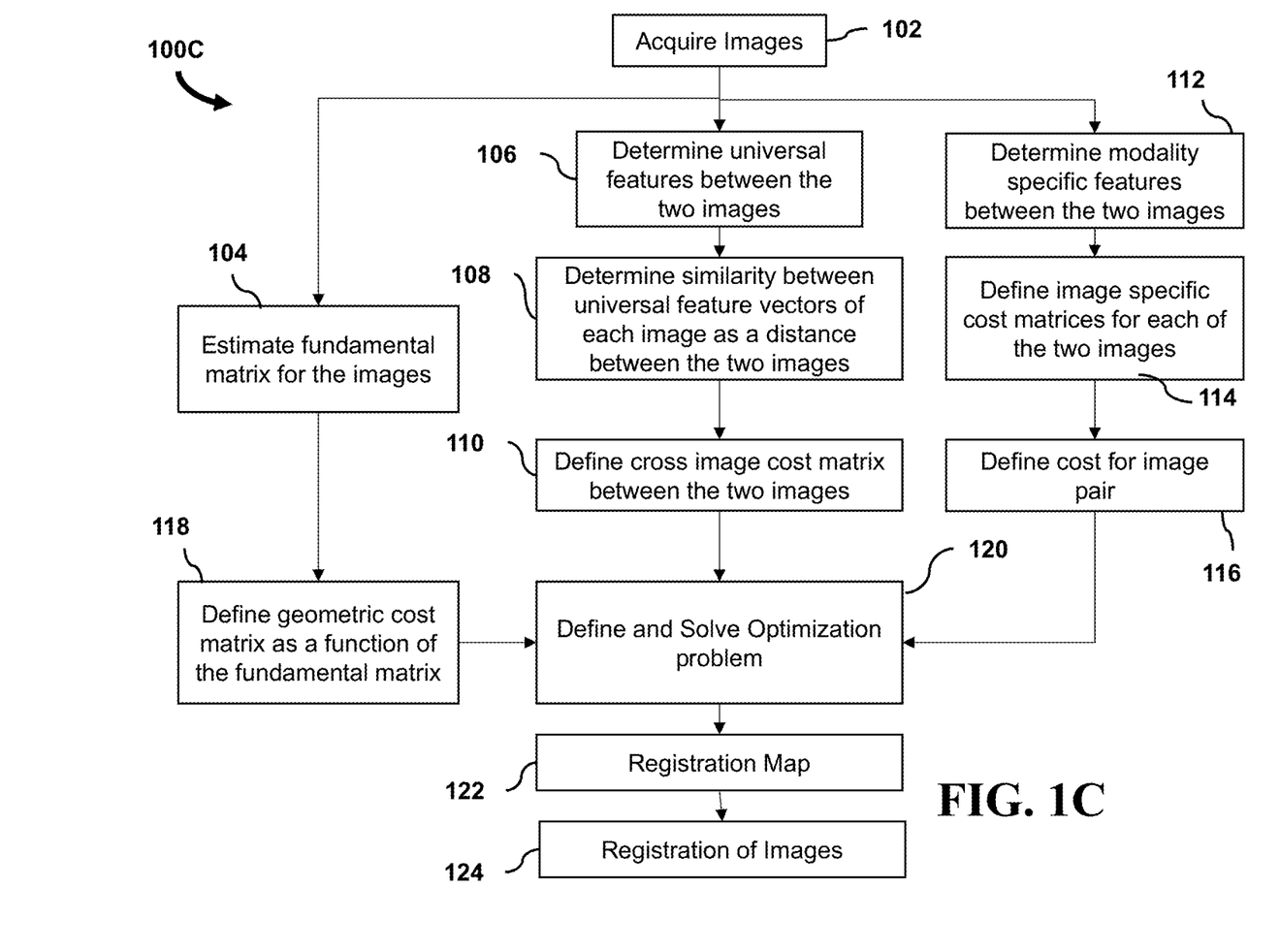
FIG. 1C illustrates an example method for generating a registration map, according to embodiments of the present disclosure.

Some example embodiments that are realized through frameworks, methods and systems for image registration and fusion, will now be described with reference to the accompanying figures. In particular, FIG. 1A is a block diagram of a framework for generating a registration map for image registration, according to embodiments of the present disclosure and FIG. 1B is a block diagram of a framework for image fusion, according to embodiments of the present disclosure. FIG. 1C which will be discussed in conjunction with FIG. 1A, illustrates an example method for generating a registration map, according to embodiments of the present disclosure. As discussed previously, image registration 60 is essential for successful fusion 70 of images to form a meaningful and information rich fused image for further use such as in remote sensing. Towards this objective, the framework 100A for generating registration map can be applied for performing accurate registration 60 of a target image 10A with a reference image 10B based on a registration map 50. In the example framework illustrated in FIG. 1B the generation of the registration map 50 may be a part of the fusion framework 100B.

With particular reference to FIG. 1C, in the method 100C, multiple images of a three-dimensional scene may be captured or acquired 102 for performing image registration. The images may be obtained from one or more imaging sensors or may be obtained by other means or from other sources, e.g., a memory transfer, or wireless or wireless communication. It is possible, a user interface in communication with a processor can acquire and store the set of multi-angled view images in a computer readable memory upon receiving an input from a surface of the user interface by a user. One of the acquired images may be a reference image (hereinafter designated as Image 1) while at least one of the other images may be a target image (hereinafter designated as Image 2) which is to be registered with the reference image. The images may be taken with different cameras or same cameras, may have different levels of illumination, and/or may correspond to a different viewpoint of the scene (i.e., multi-view images). In some example embodiments, the images may be aerial images with pixel resolutions showing differences in elevation from a ground of different objects in the scene. Some universal and some non-universal features may be defined between the images. In some example embodiments, the modality of a first image may be different from a modality of a second image. The modality of the first and the second image may be selected from a group consisting of optical color images, optical gray-scale images, depth images, infrared images, SAR images.

At 104, the method 100C of FIG. 1C, a fundamental matrix for the images based on epipolar geometry between the two images may be estimated. In some example embodiments, the fundamental matrix may be estimated by key points in the multi-angled images and the key points may be extracted by corner detection and followed by feature (e.g., SIFT) matching. To further improve the accuracy of fundamental matrix estimation, the random sample consensus (RANSAC) method can be used to reduce the impact of outliers (incorrectly matched key points).

Further, universal features of the two images may be determined 106. As used herein, universal features may mean that the features extracted from the two images lie in the same space, even though the images may not. For example, a feature vector for such a feature at the $i^{th}$ pixel in Image 1 may be denoted as $f_1[i]$ and that at the $j^{th}$ pixel in Image 2 as $f_2[j]$. Since $f_1[i]$ and $f_2[j]$ lie in the same space, there similarity may be determined 108 by some distance defined on that space, for example, the $l_1$ norm may be used and a cross-image cost matrix C may be defined 110 as:

$$C[i,j] = \|f_1[i] - f_2[j]\|_1 \quad (1)$$

As is clear from the above, the cross-image cost matrix may be defined based on the universal feature vectors between the images.

Furthermore, features of the two images that are not defined in the same space are also determined 112. Such features may include for example, modality specific features. In some example embodiments, the pixel coordinates and the 3-channel intensity values may be used as this feature vector. The corresponding feature vectors have the form $g_1[i] = (\beta x, \beta y, (1-\beta)I_1, (1-\beta)I_2, (1-\beta)I_3)$, where (x, y) is the coordinate of the $i^{th}$ pixel in Image 1, $I_k$ is the intensity value in the $k^{th}$ channel at (x, y), and $\beta \in [0, 1]$ is the weight that controls the contribution from coordinates and from intensity. Similar definition is applied to Image 2. If the two images are not illuminated by the same source and are not taken from the same view angle, then $g_1$ and $g_2$ cannot be compared directly, thus the notion from GW (discussed later with reference to FIG. 2) may be used to define similarity measure between pair-wise difference. In one example embodiment, if '$l_1$ norm is chosen as the metric for both images, then the image-specific cost matrices for Image 1 and Image 2 may be defined 114 as:

$$C^1[i,i'] = \|g_1[i] - g_1[i']\|_1$$

$$C^2[j,j'] = \|g_1[j] - g_1[j']\|_1 \quad (2)$$

Next, the squared distance may be selected as the similarity measure between the pair-wise difference, and the cost for the pair (i, i') in Image 1 and the pair (j, j') in Image 2 is defined 116 as $C^1[i, i'] - C^2[j, j']$.

At 118, the method defines a geometric cost matrix as a function of the fundamental matrix using an epipolar geometry based regularizer. Towards this end, Sampson discrepancy may be utilized. The geometric cost matrix helps to penalize registration maps that violate epipolar geometry. As an example, the geometric cost matrix may be defined as a function of the fundamental matrix $F_{21}$ using Sampson discrepancy as:

$$G[i,j] = <r_2[j], F_{21}r_1[i]>^2 / (\|F_{21}r_1[i]\|_2^2 + \|F_{21}^T r_2[j]\|_2^2) \quad (3)$$

Next an optimization problem to find the registration map T may be defined and solved 120 using the information determined at steps 110, 116, and 118. That is, the optimization problem is defined as a function of the cross-image cost matrix C [i, j], the cost for the pair (i, i') in Image 1 and the pair (j, j') in Image 2, and the geometric cost function G.

Generating the registration map 50 comprises solving an optimization problem defined as a metric in the space of probability mass functions. The optimization problem is formulated as an optimal transport problem 40. Specifically, for two probability mass functions $p \in R_+^M$ and $q \in R_+^N$ defined on $X=\{x_i\}_{i=1}^M$ and $Y=\{y_i\}_{j=1}^M$ respectively, the Kantorovich's formulation of the OT distance between p and q may be defined as:

$$\min_{T \in \Pi(p,q)} \sum_{i=1,j=1}^{M,N} T[i,j] C[i,j] \quad (4)$$

where $$\Pi(p,q) = \{T \in R_+^{M \times N} \mid T1 = p, T^T 1 = q\} \quad (5)$$

is the set of all joint distributions with marginals p and q, $C \in R_+^{M \times N}$ is a cost matrix, whose $(i,j)^{th}$ entry is defined as $C[i,j]=c(x_i, y_j)$ for some pre-defined function $c: X \times Y \mapsto R$, which represents the cost of transporting mass from $x_i$ to $y_j$.

A suitable example of OT distance is the Gromov-Wasserstein (GW) distance which defines discrepancy of inter-relationships between two signals defined on possibly different metric spaces $(X, d_X)$ and $(Y, d_Y)$ as:

$$\min_{T \in \Pi(p,q)} \sum_{i,i'=1,j,j'=1}^{MN} T[i,j] T[i',j'] D(C^X[i,i'] C^Y[j,j'])$$

where D is a metric on R, $C^X \in R^{M \times M}$ and $C^Y \in R^{N \times N}$ are cost matrices on X and Y respectively, which are defined as $C^X[i,i']=d_X(x_i, x_{i'})$ and $C^Y[j,j']=d_Y(y_j, y_{j'})$.

Gromov-Wasserstein (G-W) distance, in which the ground cost attempts to match pairs of points in one image to pairs of points in the other image, such that the ground cost distance of features extracted from the pair in the first image is similar to the ground cost of features extracted from the pair in the second image for corresponding pairs. As such, Gromov-Wasserstein distance is more appropriate for registering multi-modal images because the ground cost distance is computed only within points of the same image, i.e., within the same modality, and therefore, features extracted from points in different modalities are never directly compared.

Figure 2:
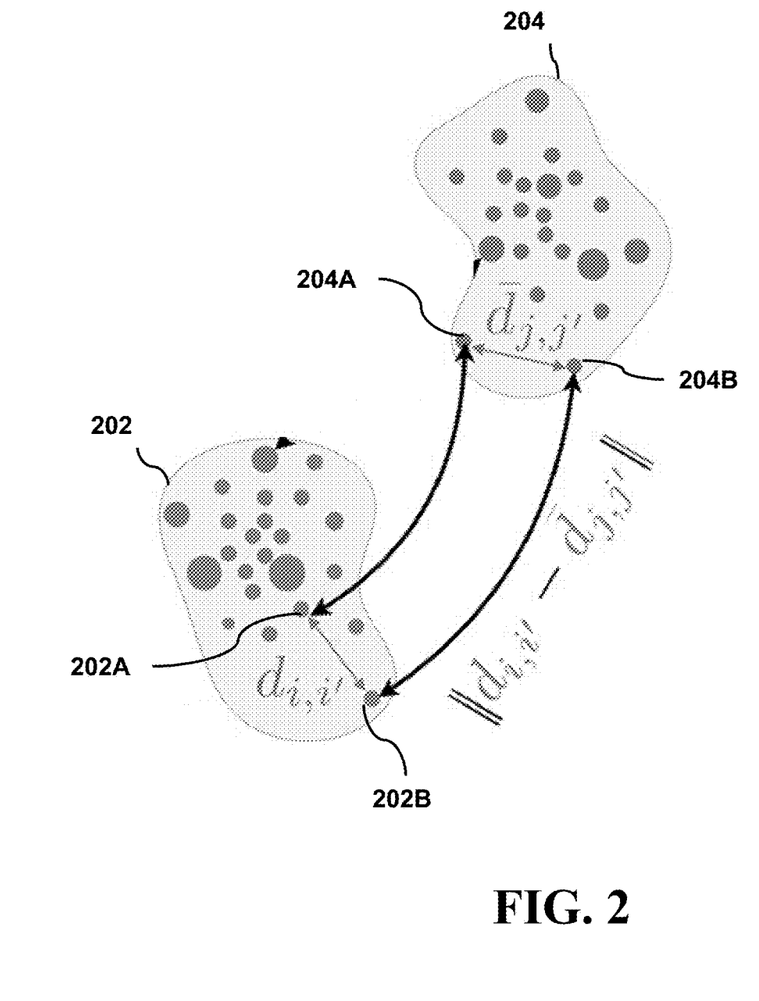
FIG. 2 illustrates a schematic for computation of Gromov-Wasserstein (G-W) distance between two images, according to some example embodiments.

One example for computation of G-W distance is discussed next with reference to FIG. 2 which illustrates a schematic for computation of G-W distance between two images, according to some example embodiments. Two images 202 and 204 may be taken up for registration. It may be noted that a point in image 202 cannot be compared with a point in 204 unless they lie in a common space. In other words, feature and intensity-based comparison between two images in unregistered spaces is not possible. For the sake of this invention a point in an image may correspond to a region, one or more pixels or any two-dimensional span. The points may be representative of features of the images such as pixel intensity values or higher dimensional features such as SIFT.

A distance $d_{i,i'}$ between points 202A and 202B is first computed within the image 202. In a similar manner, a distance $\bar{d}_{j,j'}$ between points 204A and 204B is also computed within the image 304. It is noteworthy to mention here that the two distances $d_{i,i'}$ and $\bar{d}_{j,j'}$ are each computed between pair of points that lie in different metric spaces. The Gromov-Wasserstein distance between the two images 202 and 204 may then be defined as a comparison between these two distances $d_{i,i'}$ and $\bar{d}_{j,j'}$ as:

$$\|d_{i,i'} - \bar{d}_{jj'}\| = \min_{P \in \Pi(p,q)} \sum_{i,i',j,j'} l(d(x_i, x_{i'}), \bar{d}(y_j, y_{j'})) P_{i,j} P_{i'j'}$$

Thus, in case where features of one image are an isometric transform of features of the other, G-W distance defines a similarity measure between pair-wise distance in one image and that of the other, where the distances defined on the two images need not be the same and can be chosen based on the isometry.

The computation of Gromov-Wasserstein distance involves the minimization of a non-convex function of a registration map. Finding a local optimum of such a non-convex function is essential for computing the GW distance. Towards this objective, the framework comprises using a distance derived from the epipolar geometry between the images. Specifically, it is realized that epipolar geometry can constrain the points in the reference image to which the point in the target image can be mapped. For example, the registration map should map a point in one image to a point on the corresponding epipolar line in the other image defined by the fundamental matrix between the two images. Since the two images correspond to the same scene, the registration map generated by the OT method should obey constraints derived from epipolar geometry between the two images. The framework incorporates such a constraint in the cost function of the OT method. For example, a distance that quantifies how much the epipolar geometry is violated (i.e. epipolar discrepancy 20) may be used as a regularizer 30 in the cost function of the OT method such that the optimization, e.g., minimization, of the cost function also attempts to minimize the regularizer 30. In this way, the framework attempts to utilize the epipolar geometry-based regularizer 30 to penalize registration maps that violate epipolar geometry constraints, which results in finding a better solution of the optimization problem.

Figure 3:
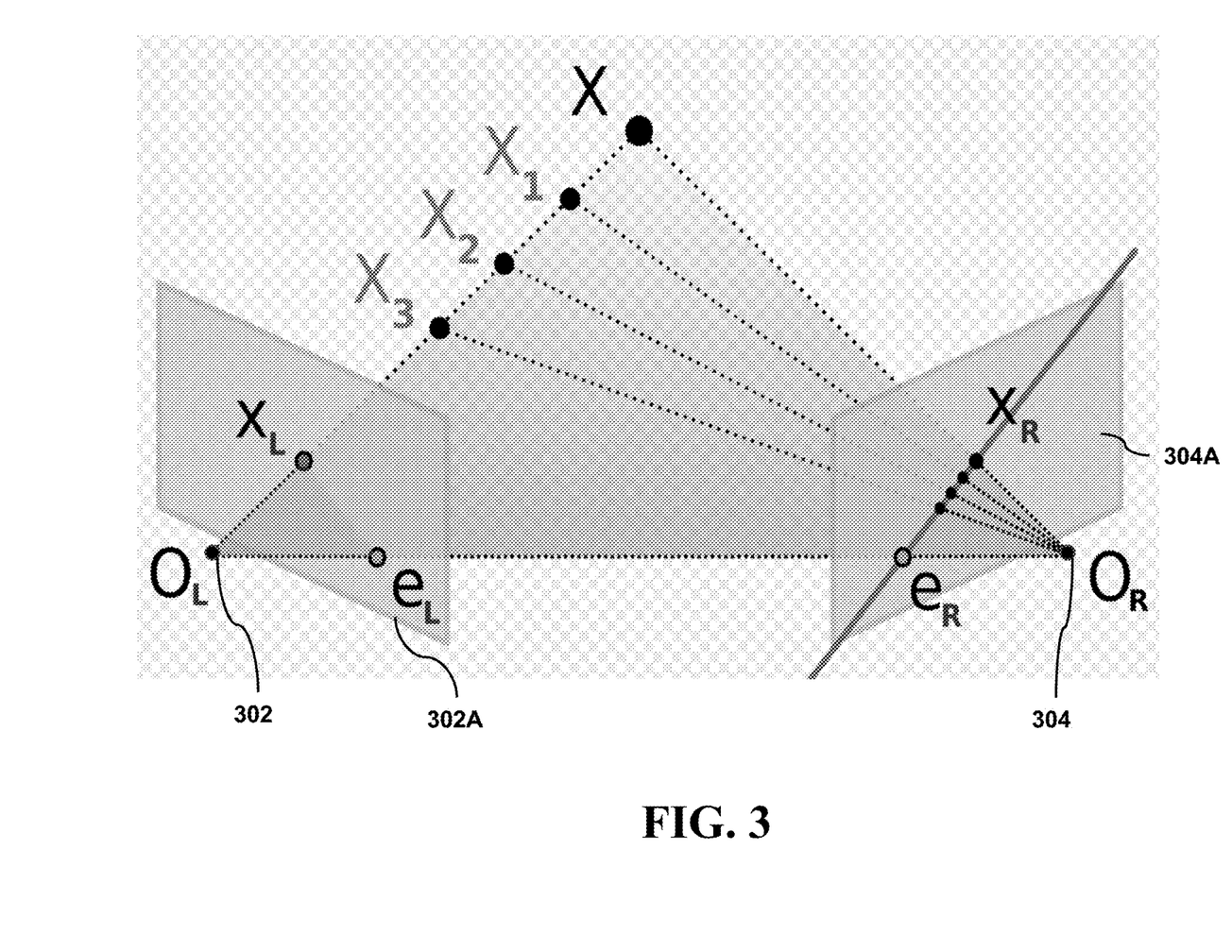
FIG. 3 illustrates a schematic explaining epipolar geometry between two images according to some example embodiments.

FIG. 3 illustrates a schematic explaining epipolar geometry between two images according to some example embodiments. Epipolar geometry may be explained as the geometry of stereo vision. For example, when two cameras view a 3D scene from two distinct positions, there are a number of geometric relations between the 3D points and their projections onto the two-dimensional (2D) images that lead to constraints between the image points. These relations can be derived based on the assumption that the cameras can be approximated by the pinhole camera model. If the relative position of the two cameras viewing the 3D scene is known, then for each point observed in one image the same point must be observed in the other image on a known epipolar line. This provides an epipolar constraint which can also be described by the fundamental matrix between the two cameras.

As illustrated in FIG. 3, two pinhole cameras 302 and 304 may be utilized to image a scene comprising a point X. In real cameras, the image plane may actually be behind the focal center, and produces an image that is symmetric about the focal center of the lens. Here, however, the problem may be simplified by considering a virtual image plane in front of the focal center i.e., optical center of each camera lens, to produce an image not transformed by the symmetry. $O_L$ and $O_R$ represent the centers of symmetry of the two cameras' lenses. X represents the point of interest in both cameras. Points $X_L$ and $X_R$ are the projections of point X onto the image planes 302A and 304A, respectively. Since each camera captures a 2D image of the 3D world, this conversion from 3D to 2D may be referred to as a perspective projection and is described by the pinhole camera model. Such projection operation may be modeled by rays that emanate from a camera, passing through its focal center. Each emanating ray corresponds to a single point in the image. Since the optical centers of the cameras' lenses are distinct, each center projects onto a distinct point into the other camera's image plane. These two image points, denoted by $e_L$ and $e_R$, may be referred to as epipoles or epipolar points. Both epipoles $e_L$ and $e_R$ in their respective image planes 302A and 304A, respectively and both optical centers $O_L$ and $O_R$ lie on a single 3D line.

The line $O_L$-X is seen by the camera 302 as a point because it is directly in line with that camera's lens optical center. However, the camera 304 sees this line as a line in its image plane. That line ($e_R$-$X_R$) in the camera 304 is called an epipolar line. Symmetrically, the line $O_R$-X is seen by the camera 304 as a point and is seen as epipolar line $e_L$-$X_L$ by the camera 302. An epipolar line is a function of the position of point X in the 3D space, i.e., as X varies, a set of epipolar lines is generated in both images. Since the 3D line $O_L$-X passes through the optical center of the lens $O_L$, the corresponding epipolar line in the right image (i.e., in the image for camera 304) must pass through the epipole $e_R$ (and correspondingly for epipolar lines in the left image). All epipolar lines in one image contain the epipolar point of that image. In fact, any line which contains the epipolar point is an epipolar line since it can be derived from same 3D point X. As an alternative visualization, consider the points X, $O_L$ & $O_R$ that form a plane called the epipolar plane. The epipolar plane intersects each camera's image plane where it forms lines—the epipolar lines. All epipolar planes and epipolar lines intersect the epipole regardless of where X is located.

When the relative position as described above is known for each camera 302 and 304, an epipolar constraint defined by the fundamental matrix between the two cameras may be obtained. For example, assuming that the projection point $X_L$ is known, and the epipolar line $e_R$-$X_R$ is known and the point X projects into the right image, on a point $X_R$ which must lie on this particular epipolar line. This means that for each point observed in one image the same point must be observed in the other image on a known epipolar line. This provides an epipolar constraint: the projection of X on the right camera plane $X_R$ must be contained in the $e_R$-$X_R$ epipolar line. All points X e.g., $X_1$, $X_2$, $X_3$ on the $O_L$-$X_L$ line will verify that constraint. It means that it is possible to test if two points correspond to the same 3D point. Epipolar constraints can also be described by the essential matrix or the fundamental matrix between the two cameras. Thus, using epipolar constraints it is possible to test if two points correspond to the same 3D point. Such a use of epipolar geometry may be considered as a positive use, wherein the geometry is used for direct computation or testing of matching points.

However, when camera calibration is an unknown parameter, which is very likely with multimodal images, the positive use of epipolar geometry does not fit into the computation. As such, the amount of violation of the epipolar geometry for each pair of points from the two images is a better and a non-obvious constraint to help minimize the OT distance between the two images. This violation may be considered as epipolar geometry's negative usage. Such a usage has advantages in terms of reducing the amount of information required to perform registration. For example, instead of point to point relevancy, epipolar geometry's negative usage can work even with point to line relevancy.

Epipolar geometry describes relationships between multiple images of a common 3D scene. Specifically, for two such images (Image 1 and Image 2), there exists a fundamental matrix $F_{21} \in R^{3 \times 3}$, such that:

$$<r_2, F_{21} r_1> = 0 \tag{6}$$

if $r_1$ in Image 1 and $r_2$ in Image 2 corresponds to a same point in 3D. Here $r_1$ and $r_2$ are homogeneous representations of pixel coordinates, i.e., $r_1 = (x_1, y_1, 1)$, where $(x_1, y_1)$ is the pixel coordinate in Image 1.

Since the fundamental matrix is already estimated as a part of the method, the point-to-line mapping induced by epipolar geometry is not put as a hard constraint, instead, it is used as a regularizer to solve the optimization problem 40 of FIG. 1A. Referring back to FIG. 1B, combining the equations (1)-(3) determined at steps 110, 116, and 118 of the method 100B, the optimization problem for obtaining the registration map between Image 1 and Image 2 is defined and solved as:

$$\min_{T \in \Pi(p,q)} \left\{ (1-\alpha) \sum_{i,j=1}^{N} T[i,j] C[i,j] + \alpha \sum_{i,i'=1,j,j'=1}^{N} \right. \tag{7}$$
$$\left. T[i,j] T[i',j'] (C^1[i,i'] - C^2[j,j'])^2 + \lambda \sum_{i,j=1}^{N} T[i,j] G[i,j] \right\}$$

where $\alpha \in [0, 1]$ and $\lambda > 0$ are tuning parameters. These parameters control the trade-offs between costs defined by universal features, modality-specific features, and epipolar geometry-induced discrepancy. For example, a very large $\lambda$ value may result in a registration map T that maps each point in one image to a very thin band surrounding the corresponding epipolar line in the other image, because a small violation of the epipolar geometry may lead to a large value of the last term in (7) due to the large $\lambda$ value.

A solution to the optimization problem defined at (7) yields 122 the registration map T as a matrix. Next, the Image 2 may be registered 124 with Image 1 using the registration map using any suitable technique. One example technique for registration of images is described next with reference to FIG. 4.

Figure 4:
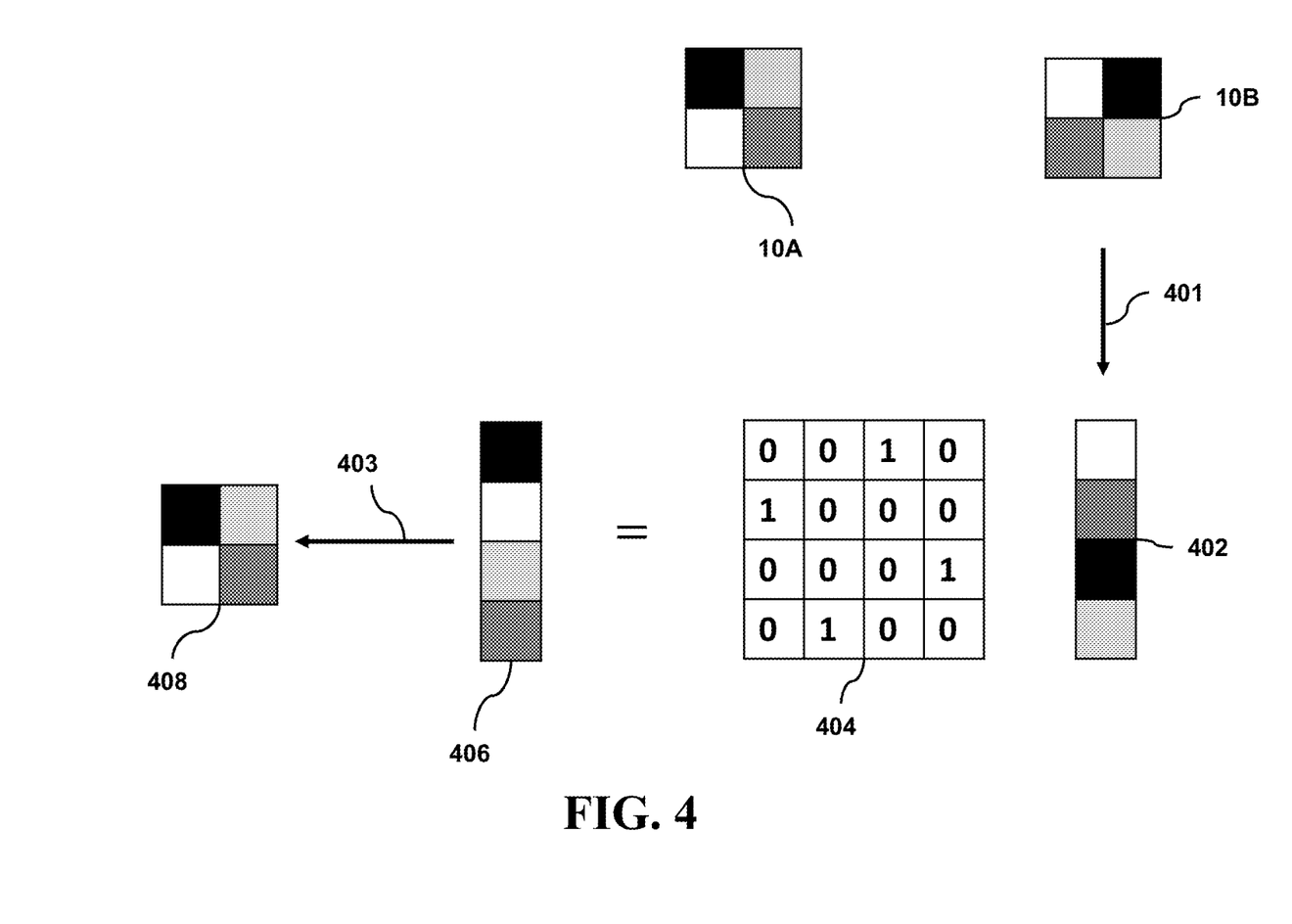
FIG. 4 illustrates a schematic diagram of an image registration process, according to some example embodiments.

FIG. 4 illustrates a schematic diagram of an image registration process, according to some example embodiments. A reference image, such as image 10A of FIG. 1A and a target image, such as image 10B of FIG. 1A may be the candidates for registration. A registration map such as the registration map 50 generated at step 122 of FIG. 1B may be obtained as a matrix 404. The target image 10B may be warped to obtain a vectorized matrix form 402 of the target image 10B. The product of the vectorized matrix form 402 and the registration map matrix 404 may yield a one dimensional matrix 406 form of the target image 10B. Finally, this one dimensional matrix 406 form of the target image 10B may be reshaped to obtain a registered target image 408. The reshaping 403 may be performed using any suitable technique, for example an invert of the vectorization step 401. The registered target image 408 obtained in the manner as described above should look like the reference image because the registration map obtained as per the process entailed with reference to FIG. 1C takes care of epipolar anomalies.

The example methods disclosed above may be executed by an information processing device such as an image processing engine. Such an information processing device may comprise at least a processor and a memory. The memory may store executable instructions and the processor may execute the stored instructions to carry out some or all of the steps listed above. It may be noted that at least some of the steps of the method for registration and fusion of images may be performed in a dynamic fashion such that a solution to the optimal transport problem to produce the registration map may be performed on the fly. One example of such an image processing engine is described later in the disclosure with reference to FIG. 7.

Example embodiments disclosed herein have several practical implementations. Since the systems and methods disclosed herein utilize G-W distance, it leads to finding a better local optimum of the non-convex function of the registration map. This in turn provides an increment in terms of accuracy of finding a registration map which will ultimately lead to generation of highly accurate registered images. Thus, an image fusion process will greatly benefit from such an accurate generation of registered images. Thus, real world problems such as missing pixel completion in images or removing occlusions to gather more information can be solved to find better solutions.

Furthermore, since the example embodiments cater to scenarios where the images are registerable even when they are captured with different illumination spectrums and using different sensors, the example embodiments lead to scenarios where heterogenous images of the same scene can be registered and fused without any significant increase in computation or hardware costs. One example of such a heterogenous registration is registration of a Synthetic Aperture Radar (SAR) image with an optical image which is a longstanding problem in the field of remote sensing. Another example use case of some example embodiments is in the field of infrastructure tracking for detecting damages and patterns in growth. For example, surveying a large geographic area to estimate damages caused by natural calamities such as seismic activities, floods, fires is a long and strenuous task for civic agencies. The example embodiments provide avenues for capturing images of the affected areas and correlating them with a reference image that may correspond to the same area but may be preceding in time, and correlating features using epipolar discrepancy to find the features that differ. In this manner, changes to infrastructure in the geographic area may be detected and monitored. An example use case for missing pixel completion due to clouds in aerial images is discussed next with reference to FIG. 5 and FIG. 6.

Figure 5:
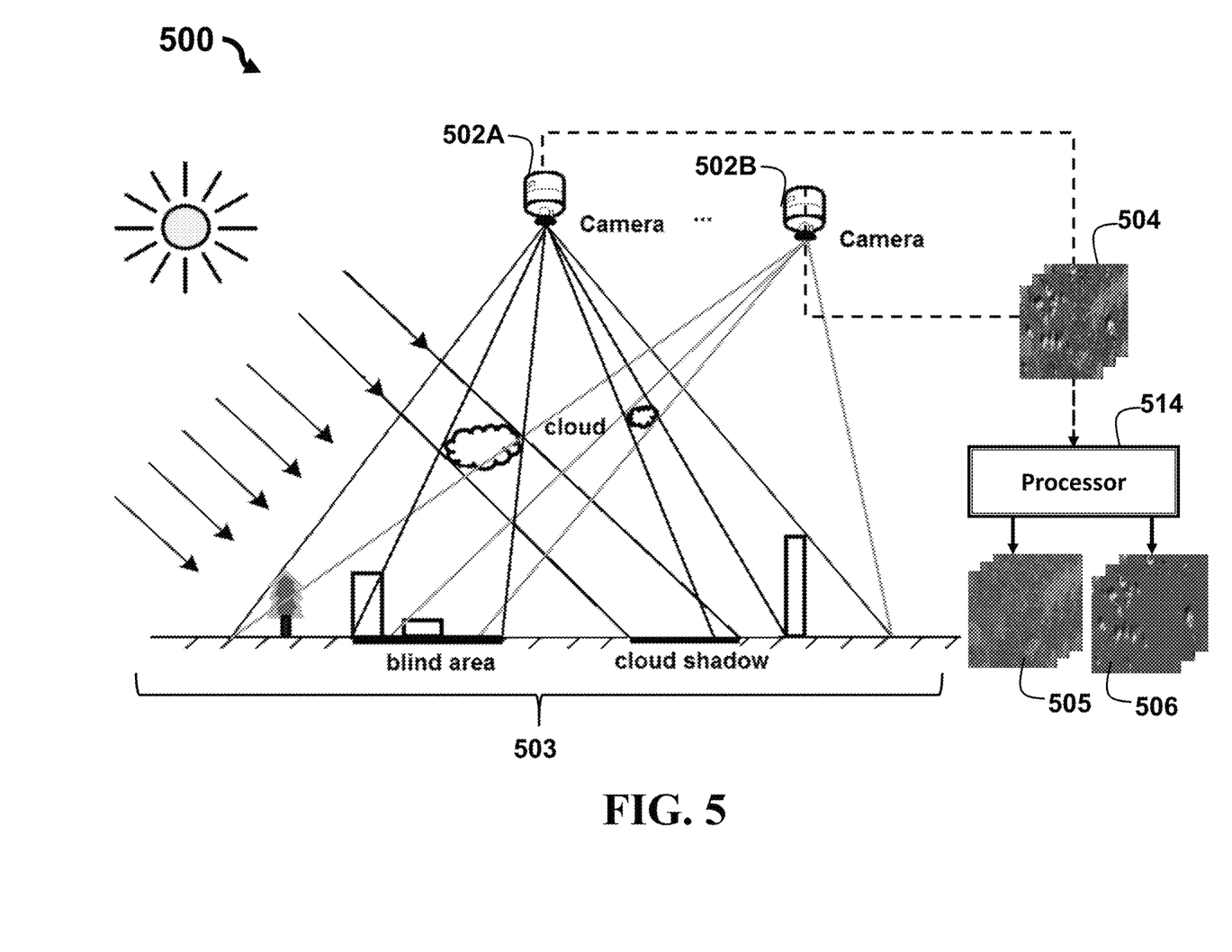
FIG. 5 is a schematic illustrating a system for enhancing images that includes the components that may be used, according to embodiments of the present disclosure.

FIG. 5 is a schematic illustrating a system 500 for enhancing images that includes the components that may be used, according to embodiments of the present disclosure. Sensors 502A, 502B, i.e., a camera in a satellite, sequentially or non-sequentially, capturing a set of input images 504 of a scene 503. The cameras 502A, 502B may be in a moving airplane, satellite or some other sensor carrying device allowing pictures to be taken of the scene 503. Further, the number of sensors 502A, 502B are not limited in number, and the number of sensors 502A, 502B may be based upon a specific application. The input images 504 can be obtained by a single moving sensor at time steps t, or by multiple sensors 502A, 502B taken at different times, different angles and different elevations. Sequential acquisition reduces memory requirements to store the images 504, because the input images 504 can be processed online as they are acquired by one or more sensor 502A, 502B and received by a processor 514. The input images 504 can overlap to facilitate registering the images with each other. The input images 504 can be gray scale images or color images. In addition, the input images 504 can be multi-temporal images or multi-angle view images acquired sequentially.

One or more sensor 502A, 502B can be arranged in a moving space or airborne platform (satellite, airplane or drone), and the scene 503 can be ground terrain or some other scene located on the surface or above the surface of the earth. The scene 503 can include occlusions due to structures in the scene 503, such as buildings, and clouds between the scene 503 and the one or more sensor 502A, 502B. At least one goal of the present disclosure, among other goals, is to produce a set of enhanced output images 505, without occlusions. As a by-product, the system also produces a set of sparse images 506 including just the occlusions, e.g., the clouds.

Figure 6:
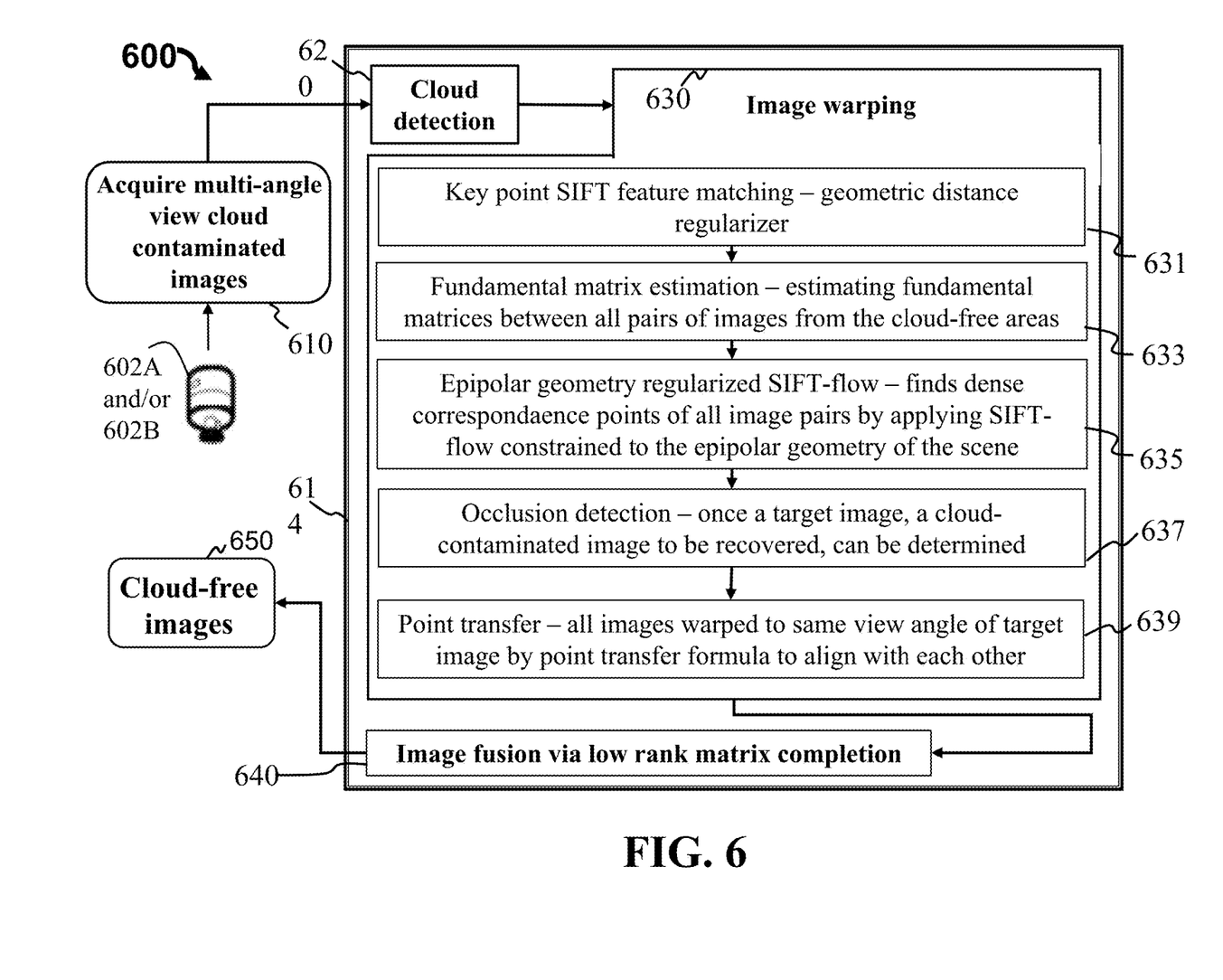
FIG. 6 is a flow diagram of the system of FIG. 5 that provides details of forming a matrix using vectorized aligned multi-angled view images and the matrix completion, according to embodiments of the present disclosure.

FIG. 6 is a flow diagram of the system of FIG. 5 that provides details of forming a matrix using vectorized aligned multi-angled view images and the matrix completion, according to embodiments of the present disclosure. As shown in FIG. 6, the system operates in a processor 614, which may be coupled to the sensors 602A, 602B, either electrically or wirelessly.

The set of input images 604 of FIG. 5 are acquired 610 by the processor 614 either directly or indirectly, e.g., the image may be acquired by sensors 602A, 602B, i.e. a camera, a video camera, or can be obtained by other means or from other sources, e.g., a memory transfer, or wireless or wireless communication. It is possible, a user interface in communication with the processor and the computer readable memory, can acquire and store the set of multi-angled view images in the computer readable memory upon receiving an input from a surface of the user interface by a user. The images 604 may comprise multi-angled view images of a three dimensional scene, for example, of a geographic area.

The multi-angled view images 604 may be aligned to a target view angle of the scene based on a registration map, which may be generated for example in a manner disclosed previously with reference to FIGS. 1-4. Such an alignment of the multi-angled view images 604 may be performed to form a set of aligned multi-angled view images representing a target point of view of the scene. In example embodiments where these images 604 correspond to aerial images of a scene, at least one aligned multi-angled view image of the multi-angled view images, may have missing pixels due to the clouded area.

Cloud detection 620 may be performed based on the intensity and total variation of small patches, i.e., total variation thresholding. Specifically, by dividing an image into patches, and computing an average intensity and total variation of each patch such that each patch can be labeled as cloud, or cloud shadow, under specific conditions. The detected regions with a small area can be then removed from the cloud mask, since they are likely to be other flat objects such as building surfaces or shadows of buildings. Finally, the cloud mask can be dilated so that the boundary of the cloud-covered areas with thin clouds are also covered by the cloud mask.

Aligning of the multi-angled view images to the target view angle of the scene forms the set of aligned multi-angled view images representing the target point of view of the scene that can be based on a fundamental matrix. Wherein the fundamental matrix is estimated by key points in the multi-angled images and the key points are based on SIFT Matching. For example, image warping 630 can be achieved by key point SIFT feature matching 731, i.e. SIFT-flow with a geometric distance regularizer, followed by epipolar point transfer. In particular, the present disclosure may use an approach of estimating fundamental matrices 633, between all pairs of images from the cloud-free areas, and then finds dense correspondence points of all image pairs by applying SIFT-flow constrained to the epipolar geometry of the scene 635, such that the fundamental matrix is estimated by key points in the multi-angled images. Further, it is contemplated that an iterative process including more images can improve the fused image that meets a threshold such that the selected image is high correlated to the image to be recovered.

Still referring to FIG. 6, once a target image, a cloud-contaminated image to be recovered, can be determined 637, all other images are warped to the same view angle of the target image by a point transfer formula 639, such that they are aligned with each other.

After image warping, a collection of images that are warped to align with the target image are available. The warped images contain missing pixels due to cloud contamination or occlusion. Such that, image fusion can be accomplished using the matrix completion technique, assuming that the matrix formed by concatenating vectorized well-aligned images has low rank 640. Low-rank matrix completion estimates the missing entries of a matrix under the assumption that the matrix to be recovered has low rank. Since direct rank minimization is computationally intractable, convex or nonconvex, relaxation can be usually used to reformulate the problem. Thus, the cloud free images are generated 650.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Figure 7:
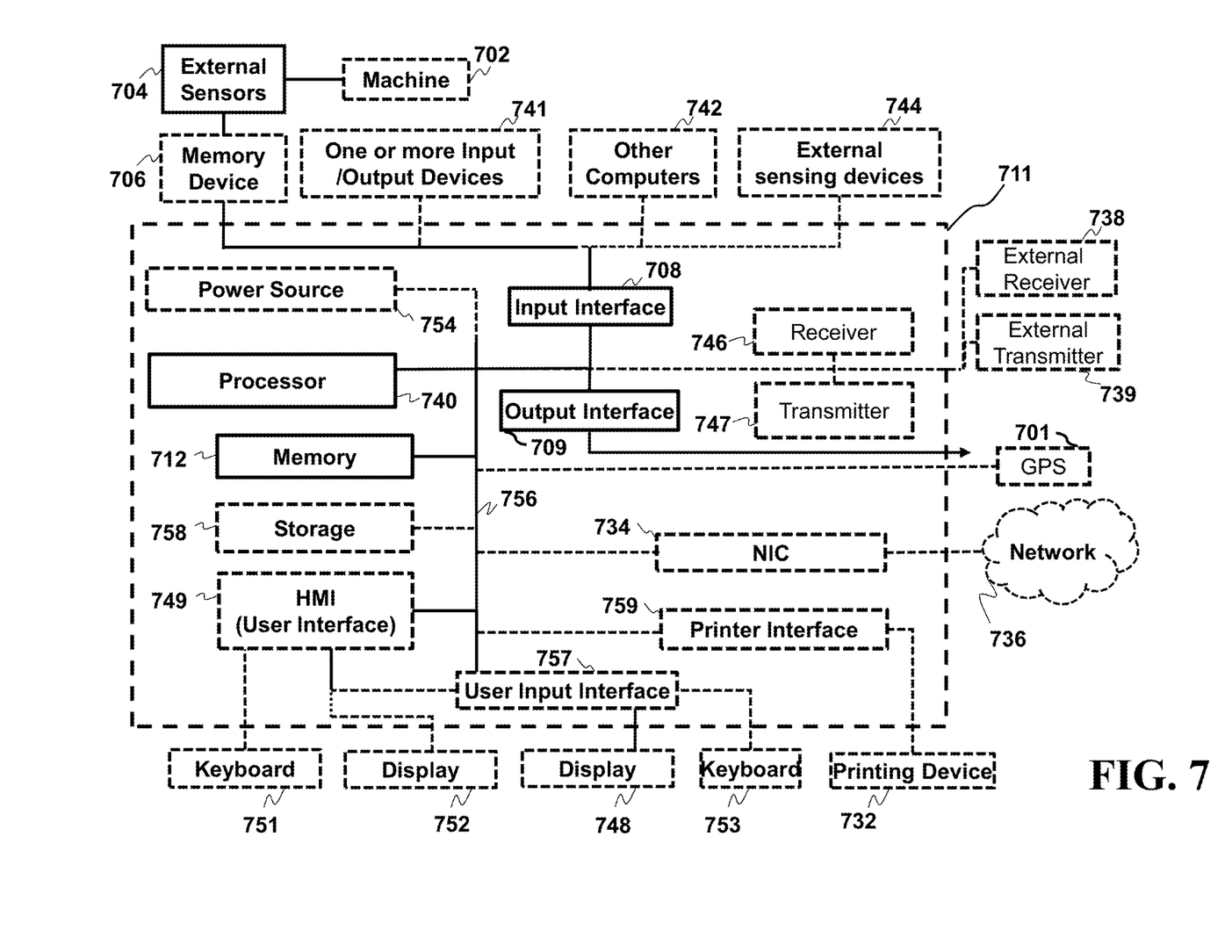
FIG. 7 illustrates a block diagram of a system for image registration and fusion, that can be implemented using an alternate computer or processor, according to embodiments of the present disclosure.

FIG. 7 illustrates a block diagram of a system for image registration and fusion, that can be implemented using an alternate computer or processor, according to embodiments of the present disclosure. The computer 711 includes a processor 740, computer readable memory 712, storage 758 and user interface 749 with display 752 and keyboard 751, which are connected through bus 756. For example, the user interface 764 in communication with the processor 740 and the computer readable memory 712, acquires and stores the image data in the computer readable memory 712 upon receiving an input from a surface, keyboard 753, of the user interface 757 by a user.

The computer 711 can include a power source 754, depending upon the application the power source 754 may be optionally located outside of the computer 711. Linked through bus 756 can be a user input interface 757 adapted to connect to a display device 748, wherein the display device 748 can include a computer monitor, camera, television, projector, or mobile device, among others. A printer interface 759 can also be connected through bus 756 and adapted to connect to a printing device 732, wherein the printing device 732 can include a liquid inkjet printer, solid ink printer, large-scale commercial printer, thermal printer, UV printer, or dye-sublimation printer, among others. A network interface controller (NIC) 734 is adapted to connect through the bus 756 to a network 736, wherein image data or other data, among other things, can be rendered on a third party display device, third party imaging device, and/or third party printing device outside of the computer 711.

Still referring to FIG. 7, the image data or other data, among other things, may be transmitted over a communication channel of the network 736, and/or stored within the storage system 758 for storage and/or further processing. Further, the time series data or other data may be received wirelessly or hard wired from a receiver 746 (or external receiver 738) or transmitted via a transmitter 747 (or external transmitter 739) wirelessly or hard wired, the receiver 746 and transmitter 747 are both connected through the bus 756. The computer 711 may be connected via an input interface 708 to external sensing devices 744 and external input/output devices 741. For example, the external sensing devices 744 may include sensors gathering data before-during-after of the collected time-series data of the machine. The computer 711 may be connected to other external computers 742. An output interface 709 may be used to output the processed data from the processor 740. It is noted that a user interface 749 in communication with the processor 740 and the non-transitory computer readable storage medium 712, acquires and stores the region data in the non-transitory computer readable storage medium 712 upon receiving an input from a surface 752 of the user interface 749 by a user.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which some examples have been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. An image processing system for determining a registration map between a first image of a scene with a second image of the scene, comprising: at least one processor; and a memory having instructions stored thereon that, when executed by the at least one processor, cause the image processing system to:

solve an optimal transport (OT) problem to produce the registration map by optimizing a cost function that determines a minimum of a ground cost between the first and the second images modified with an epipolar geometry-based regularizer including a distance that quantifies the violation of an epipolar geometry constraint between corresponding points defined by the registration map;

wherein the ground cost compares a ground cost distance of features extracted within the first image with a ground cost distance of features extracted from the second image.

2. The image processing system of claim 1, wherein the system is further configured to register the first image and the second image according to the registration map.

3. The image processing system of claim 1, wherein the ground cost distance of features within the first image is determined based on a similarity measure between pair-wise difference between pixels in the first image and the ground cost distance of features within the second image is determined based on a similarity measure between pair-wise difference between pixels in the second image.

4. The image processing system of claim 3, wherein the similarity measure between pair-wise difference between pixels in the first image and the similarity measure between pair-wise difference between pixels in the second image are each defined as per Gromov-Wasserstein notion.

5. The image processing system of claim 1, wherein solving the OT problem comprises determining an OT distance as a Gromov-Wasserstein (GW) distance between vectors of features of the scene in the first and second images.

6. The image processing system of claim 5, wherein the first and the second images are aerial images with pixel resolutions showing differences in elevation from a ground of different objects in the scene.

7. The image processing system of claim 6, wherein the epipolar geometry-based regularizer is a function of a fundamental matrix between the first and second images.

8. The image processing system of claim 7, wherein the epipolar geometry-based regularizer includes a Sampson discrepancy.

9. The image processing system of claim 6, wherein the processor is further configured to fuse the first and the second images according to the registration map to output a fused image.

10. The image processing system of claim 9, wherein a modality of the first image is different from a modality of the second image.

11. The image processing system of claim 10, wherein the modality of the first and the second image is selected from a group consisting of optical color images, optical gray-scale images, depth images, infrared images, and synthetic aperture radar (SAR) images.

12. The image processing system of claim 5, wherein the first and the second images comprise non-universal features of the scene, and wherein feature vectors of the non-universal features in the first image and feature vectors of the non-universal features in the second image are not defined in a common space.

13. The image processing system of claim 5, wherein the feature vectors corresponding to the first image and the second image comprise one or more of pixel coordinates and 3-channel intensity values of respective one of the first image and the second image.

14. The image processing system of claim 1, wherein the OT problem is a function of a cross-image cost matrix of universal features of the first and second images, and wherein feature vectors of the universal features in the first image and feature vectors of the universal features in the second image are defined in a common space.

15. The image processing system of claim 1, wherein the first and the second images are part of a set of multi-angled view images of the scene generated by sensors, such that each multi-angled view image includes pixels, and at least one multi-angled view image includes a clouded area in at least a portion of the scene, resulting in missing pixels, wherein the processor is further configured to:
align the multi-angled view images based on the registration map to a target view angle of the scene, to form a set of aligned multi-angled view images representing a target point of view of the scene, such that at least one aligned multi-angled view image of the at least three multi-angled view images, has missing pixels due to the clouded area;
form a matrix using vectorized aligned multi-angled view images, wherein the matrix is incomplete due to the missing pixels; and
complete the matrix using a matrix completion to combine the aligned multi-angled view images to produce a fused image of the scene without the clouded area.

16. The image processing system according to claim 15, wherein the scene is a three dimensional (3D) scene and each multi-angled view image of the set of multi-angled view images are one of taken at the same or different time with unknown sensors positions relative to the 3D scene.

17. The image processing system according to claim 16, wherein the matrix completion is a low-rank matrix completion, such that each column of the low-rank matrix completion corresponds to a vectorized aligned multi-angled view image and the missing pixels of the at least one aligned multi-angled view image corresponds to the clouded area.

18. The image processing system according to claim 15, wherein the sensors are movable during the acquisition of the multi-angled view images.

19. The image processing system according to claim 18, wherein the sensors are arranged in a satellite or an airplane.

20. An image processing method for determining a registration map between a first image of a scene with a second image of the scene, comprising:
solving by a processor, an optimal transport (OT) problem to produce the registration map by optimizing a cost function that determines a minimum of a ground cost between the first and the second images modified with an epipolar geometry-based regularizer including a distance that quantifies the violation of an epipolar geometry constraint between corresponding points defined by the registration map,
wherein the ground cost compares a ground cost distance of features extracted within the first image with a ground cost distance of features extracted from the second image.

* * * * *